Patented Apr. 3, 1934

1,953,309

UNITED STATES PATENT OFFICE 1,953,309

PHENOLIC COMPOUND OF COLOR BASES

Ralph B. Payne, Elma, N. Y., assignor to National Aniline and Chemical Company, Inc., New York, N. Y., a corporation of New York No Drawing. Application June 2, 1930, Serial No. 459,017

20 Claims. (Cl. 260—64)

This invention relates to the production of new organic coloring matters which are of general value for use as colored pigments, lakes, etc., and for dyeing or coloring lacquers, varnishes, pyroxylin compositions, artificial and synthetic resins, enamels, and the like.

According to the present invention, it has been found that new organic coloring matters, which appear to be salt-like bodies, can be produced by reacting or combining compounds included within the group consisting of the color bases and their salts, particularly basic dyestuffs, with compounds included within the group consisting of the phenolic compounds which are free from a carboxyl group, but which may contain other substituents, and the pyrazolones. The reaction or combination may be effected preferably at an elevated temperature and preferably in the presence of a catalyst such as an acid or an alkali. The new coloring matters prepared by the interaction of a color base or a salt thereof, particularly a basic dyestuff, and especially a basic dyestuff of the triphenylmethane series, with a compound included within the group consisting of the pyrazolones, phenols, and naphthols which are free from an acid group (e. g., a sulfonic group or a carboxyl group), particularly with a phenol or naphthol which is free from any substituent, and especially with a naphthol, are of particular importance.

The new coloring matters of the present invention may be prepared by dissolving or suspending the color base, or a salt thereof, in a suitable solvent or diluent, for example, water, alcohol, etc., and adding thereto the phenolic compound in solid form or in solution or suspension in water or other suitable solvent or diluent, the reaction being carried out preferably in the presence of an acid, preferably a mineral acid, or of an alkali, preferably caustic alkali. When prepared in an aqueous medium, the new coloring matters generally separate as tar-like bodies or precipitates which later harden to glass-like bodies, which, in most cases, may be ground to a powder. When prepared in the presence of a solvent in which the new coloring matters are soluble, they may be recovered in any suitable manner, for example, by evaporation.

In general, the new coloring matters are insoluble, or difficultly soluble, in water. Some of them are soluble in alcohol and in benzene, others are soluble in one of these solvents but not in the other, while others are practically insoluble in either of these solvents. They vary also in their solubility in other organic solvents such as, for example, ethyl acetate, amyl acetate, diethyl phthalate, etc.

The color of the new compositions in the dry state may be similar to or different from that of the color base, but ordinarily they are of the same general color and differ only in shade from the original basic dyestuff. Of the new compositions those which are soluble in benzene are, in general, of value for coloring gasoline, waxes, fats, oils, turpentine, lacquers, varnishes, resins, rubber, etc.

The following examples will further illustrate the invention, but it will be understood that the invention is not limited thereto. The parts are by weight.

*Example 1.*—To a hot solution of 50 parts of Brilliant green (Color Index No. 662) in 1500 parts of water, there is added, with stirring, a solution of 16 parts of beta-naphthol dissolved in 180 parts of water and 5.4 parts of caustic soda. The mixture is heated to complete the reaction and the resulting tar-like precipitate is filtered off and washed with hot water. It may be dried under a vacuum or it may be dried by solution in benzene containing anhydrous sodium sulfate, and, if desired, subsequently recovered therefrom. The new product is a tar-like body at room temperature (about 25° C.). It is soluble in alcohol and in benzene to give solutions which have a green color. It may be used for coloring gasoline or for coloring lacquers, varnishes, resins, pyroxylin compositions, and the like. Brilliant green, as well as its base, are practically insoluble in benzene.

If, in the above example, the beta-naphthol is added in solid form and the reaction is carried out in the presence of hydrochloric acid in place of caustic soda, a tar-like body is similarly obtained which is soluble in alcohol and in benzene.

In a similar manner, beta-naphthol reacts with the following basic dyestuffs: with Malachite green (Color Index No. 657) to give a product which is soluble in alcohol or in benzene giving a green solution; with Victoria blue B (Color Index No. 729) to give a product which is soluble in alcohol or in benzene giving a blue solution; with Methyl violet (Color Index No. 680) to give a product soluble in alcohol or in benzene to give a violet solution; with New blue (Color Index No. 909) to give a product which is practically insoluble in benzene but is somewhat soluble with a violet color in alcohol; with Chrysoidine Y (Color Index No. 20) and with Chrysoidine 3R (Color Index No. 21) to give products soluble with a yellow color in alcohol or in benzene; with Safranine A (Color Index No. 841) to give a product soluble with a pink color in alcohol, slightly soluble in benzene, and somewhat soluble in water; with Methylene blue (Color Index No. 922) to give a product soluble with a light blue color in alcohol but only slightly soluble in benzene; with Phosphine RN to give a product somewhat soluble with a yellow color in alcohol but insoluble in benzene; with Capri blue GON (Color Index No. 876) to give a product slightly soluble in alcohol and in benzene; with Auramine (Color Index No. 655) to give a product soluble with a yellow color in alcohol and slightly soluble in benzene; with Cresyl violet 2R to give a product soluble with a violet color in alcohol but insoluble in benzene.

Example 2.—To a hot solution (about 90° to 100° C.) of 10 parts Safranine (Color Index No. 841) in 200 parts of water, there is added 6 parts of resorcinol dissolved in 60 parts of water. The resulting tarry precipitate is filtered off, washed with water, and dried. The product is soluble with a red color in alcohol. It is substantially insoluble in benzene and slightly soluble in water.

Example 3.—To a hot suspension in water of 4.18 parts of Quinizarine green (Color Index No. 1078) in 200 parts water there is added 1.44 parts of beta-naphthol and the mixture is heated to boiling at constant volume for about 6 hours. The resulting insoluble product is filtered off, washed and dried. The resulting product is more soluble in benzene, and the green colored solution has a more yellowish tone than a similar solution of Quinizarine green in benzene. The green colored benzene solution may be used to color gasoline.

Example 4.—To a hot solution of 10 parts of Brilliant green in 200 parts water (90° to 100° C.) there is added a solution of 10 parts of phenylmethylpyrazolone dissolved in 100 parts of water and 5 parts of hydrochloric acid (20° Bé.). Upon heating the solution to complete the reaction, a tarry precipitate is formed which is soluble in alcohol and practically insoluble in benzene.

As a further illustration of the invention, it may be mentioned that the product obtained by reacting alpha-naphthol, or para-nitrophenol, with Malachite green is insoluble in alcohol, water, and benzene; the product obtained by reacting Methylene blue with benzene-azo-resorcine is insoluble in water but is somewhat soluble in benzene and in alcohol; and the product obtained by reacting phenol with Bismarck brown (Color Index No. 331) is soluble in alcohol giving an orange colored solution.

In place of using hydrochloric acid or caustic soda as the catalyst, other acids and alkaline substances may be used such as, for example, sulfuric acid, phosphoric acid, boric acid, acetic acid, caustic potash, aqueous ammonia, sodium carbonate, etc. In general, the products obtained upon carrying out the reaction in the presence of an acid catalyst have the same or similar general characteristics as those obtained in the presence of an alkaline catalyst but may differ to some extent in their special properties such as, for example, solubility in various solvents, etc. In any case, the process is preferably carried out at or near the boiling temperature of the mixture and under atmospheric pressure.

It will be understood that instead of a single color base, or a single salt thereof, a mixture of color bases and/or their salts, may be reacted with a single phenolic compound, or a mixture of phenolic compounds, to prepare the new coloring matters of the present invention. The phenolic compound may contain more than one phenolic hydroxyl group, for example, two or more.

It will be also understood that the term "color bases and their salts", as used in the specification and claims, refers to color bases which combine with acids to give salts which are dyestuffs or colors, and the said salts.

It will be further understood that various changes and modifications may be made in the details of the invention, such as proportions, temperatures, solvents employed, etc., without departing from the spirit and scope thereof.

I claim:

1. The process of making a coloring matter, which comprises reacting a compound selected from the group consisting of the color bases and their salts with a compound selected from the group consisting of the phenolic bodies which are free from a carboxyl group and the pyrazolones.

2. The process of making a coloring matter, which comprises reacting a compound selected from the group consisting of the color bases and their salts with a compound selected from the group consisting of the phenols and the naphthols which are free from an acid group.

3. The process of making a coloring matter, which comprises reacting a compound selected from the group consisting of the color bases and their salts with a compound selected from the group consisting of the phenols and the naphthols which are free from other substituents.

4. A process of making a coloring matter, which comprises reacting a basic dyestuff with a compound selected from the group consisting of the phenols and the naphthols which are free from a carboxyl group and the pyrazolones.

5. A process of making a coloring matter, which comprises reacting a basic dyestuff with a naphthol which is free from an acid group.

6. As a new coloring matter, the organic reaction product of a compound selected from the group consisting of the color bases and their salts with a compound selected from the group consisting of the phenolic bodies which are free from a carboxyl group and the pyrazolones.

7. As a new coloring matter, the organic reaction product of a compound selected from the group consisting of the color bases and their salts with a compound selected from the group consisting of the phenols and the naphthols which are free from an acid group.

8. As a new coloring matter, the organic reaction product of a compound selected from the group consisting of the color bases and their salts with a compound selected from the group consisting of the phenols and the naphthols which are free from other substituents.

9. As a new coloring matter, the organic reaction product of a basic dyestuff with a compound selected from the group consisting of the phenols and the naphthols which are free from a carboxyl group and the pyrazolones.

10. As a new coloring matter, the organic reaction product of a basic dyestuff with a naphthol which is free from a carboxyl group.

11. As a new coloring matter, the organic reaction product of a basic dyestuff of the triphenylmethane series with a compound selected from the group consisting of the phenolic bodies which are free from a carboxyl group and the pyrazolones.

12. As a new coloring matter, the organic reaction product of a basic dye of the triphenylmethane series with a naphthol which is free from an acid group.

13. The process of making a coloring matter, which comprises reacting a compound selected from the group consisting of the color bases and their salts with a pyrazolone.

14. The process of making a coloring matter, which comprises reacting a basic dyestuff with a pyrazolone.

15. The process of making a coloring matter, which comprises heating a basic dye in an aqueous acid reaction medium with a pyrazolone which is free from an acid group.

16. As a new coloring matter, the organic reaction product of a pyrazolone with a compound selected from the group consisting of the color bases and their salts.

17. As a new coloring matter, the organic reaction product of a basic dyestuff with a pyrazolone which is free from an acid group.

18. As a new coloring matter, the organic reaction product of a basic dyestuff of the triphenylmethane series with a pyrazolone.

19. As a new coloring matter, the organic reaction product of a basic dyestuff of the triphenylmethane series with phenylmethylpyrazolone.

20. As a new coloring matter, the organic reaction product of a pyrazolone which is free from a carboxyl group with a compound selected from the group consisting of the color bases and their salts.

RALPH B. PAYNE.